(12) United States Patent
Fukuma et al.

(10) Patent No.: US 8,125,759 B2
(45) Date of Patent: Feb. 28, 2012

(54) ELECTRONIC APPARATUS

(75) Inventors: Yohei Fukuma, Chiba (JP); Rui Morisawa, Kanagawa (JP); Mitsuhiro Nakamura, Kanagawa (JP); Naofumi Yoneda, Tokyo (JP)

(73) Assignee: Sony Corporation, Tokyo (JP)

( * ) Notice: Subject to any disclaimer, the term of this patent is extended or adjusted under 35 U.S.C. 154(b) by 172 days.

(21) Appl. No.: 12/719,572

(22) Filed: Mar. 8, 2010

(65) Prior Publication Data

US 2010/0232100 A1    Sep. 16, 2010

(30) Foreign Application Priority Data

Mar. 16, 2009  (JP) ............................... P2009-062753

(51) Int. Cl.
*F23Q 3/00* (2006.01)
(52) U.S. Cl. ..................... 361/260; 248/349.1; 345/168; 455/575.3
(58) Field of Classification Search ............... 248/349.1, 248/553, 217.4, 276.1, 299.1, 310; 16/354, 16/293, 342, 239, 325; 361/260, 679.01, 361/679.07, 679.29, 679.2, 679.27, 679.55, 361/679.21, 679.11, 679.06, 679.23; 345/158, 345/168, 8, 173, 207, 659, 169; 455/566, 455/575.3, 575.1

See application file for complete search history.

(56) References Cited

U.S. PATENT DOCUMENTS 5,987,704 A * 11/1999 Tang ............................... 16/354
7,762,513 B2 * 7/2010 Sawai et al. ................ 248/349.1

FOREIGN PATENT DOCUMENTS

JP    2008-228249    9/2008
JP    2008-298278    12/2008

* cited by examiner

*Primary Examiner* — Hung Duong
(74) *Attorney, Agent, or Firm* — Finnegan, Henderson, Farabow, Garrett & Dunner, L.L.P.

(57) ABSTRACT

An electronic apparatus includes a display portion, a main body portion, an articulated coupling mechanism, and an interlock mechanism. The display portion includes a display screen. The main body portion is coupled to the display portion. The articulated coupling mechanism includes, at each of end portions, a plurality of coupling members each having a rotation axis and being rotatably coupled to one another in series about the rotation axis, the plurality of coupling members coupled in series having one end coupled to the main body portion side and the other end coupled to the display portion side. The interlock mechanism interlocks rotations of the plurality of coupling members with one another in the articulated coupling mechanism.

5 Claims, 14 Drawing Sheets

ELECTRONIC APPARATUS

BACKGROUND OF THE INVENTION

1. Field of the Invention

The present invention relates to an electronic apparatus such as a personal computer and a cellular phone.

2. Description of the Related Art

An electronic apparatus such as a laptop personal computer and a foldable cellular phone includes a main body portion and a display portion, and the main body portion and the display portion are coupled to each other so as to be openable/closable (foldable) via a hinge. Such an electronic apparatus needs to be provided with a coupling member such as a hinge having a certain axis diameter or more in order to obtain a torque to hold a position of the display portion with respect to the main body portion (see Japanese Patent Application Laid-open No. 2008-298278 (paragraph [0023] and FIGS. 1 and 2), for example; hereinafter, referred to as Patent Document 1).

Further, there has been recently known an electronic apparatus as described above, in which the main body portion and the display portion are coupled to each other via an articulated hinge in order to increase a degree of freedom in position (see Japanese Patent Application Laid-open No. 2008-228249 (paragraphs [0025] and [0034] and FIG. 7), for example; hereinafter, referred to as Patent Document 2).

In the electronic apparatus disclosed in Patent Document 2, the main body portion and the display portion are coupled by a chain mechanism in which two thin metal plates having flexibility are provided. One of the thin plates has one end that is fixed to the main body portion and the other end that is inserted into a groove portion provided to the display portion. The other thin plate has one end that is fixed to the display portion and the other end that is inserted into a groove portion provided to the main body portion. Each of the other ends of the two thin plates includes a projected portion. On the other hand, a plurality of recessed portions with which the projected portions are engaged are formed at predetermined positions of the groove portions that are provided to the main body portion and the display portion.

In the electronic apparatus, the chain mechanism is interlocked with an open/close operation of the electronic apparatus so that the two thin plates slide within the groove portions while being deformed in accordance with the interlock. When the electronic apparatus enters a predetermined open state, the projected portions provided to the thin plates are engaged with the recessed portions of the groove portions, and thus the open state in a desired position is held.

SUMMARY OF THE INVENTION

However, since the electronic apparatus of Patent Document 1 needs to obtain a torque to hold the position of the display portion with respect to the main body portion by a coupling member such as a hinge, it is difficult to couple the main body portion and the display portion using a coupling member that does not have a certain axis diameter or more.

Moreover, in the electronic apparatus of Patent Document 2, the main body portion and the display portion are coupled using the chain mechanism and the position of the display portion can be adjusted using the two thin plates as described above. In other words, the position of the display portion cannot be freely adjusted by only the chain mechanism.

In view of the circumstances as described above, there is a need for an electronic apparatus capable of freely adjusting a position of a display portion by an articulated coupling member having a small axis diameter.

According to an embodiment of the present invention, there is provided an electronic apparatus including a display portion, a main body portion, an articulated coupling mechanism, and an interlock mechanism.

The display portion includes a display screen. The main body portion is coupled to the display portion. The articulated coupling mechanism includes, at each of end portions, a plurality of coupling members each having a rotation axis and being rotatably coupled to one another in series about the rotation axis, the plurality of coupling members coupled in series having one end coupled to the main body portion side and the other end coupled to the display portion side. The interlock mechanism interlocks rotations of the plurality of coupling members with one another in the articulated coupling mechanism.

In the embodiment of the present invention, since the interlock mechanism that interlocks the rotations of the coupling members with one another in the articulated coupling mechanism is provided, a torque that is necessary for keeping a position of the display portion with respect to the main body portion can be dispersed by multiple joints, with the result that the position of the display portion can be freely adjusted by articulated coupling members having a small axis diameter.

The articulated coupling mechanism may be structured by coupling the plurality of coupling members in a zigzag manner to be arranged in two rows, and the adjacent coupling members in the rows may each include a circumferential surface along a rotation direction and an engagement portion on the circumferential surface so that the engagement portions are engaged with each other.

With this structure, the coupling members can be interlocked by the engagement of the engagement portions that are provided to the circumferential surfaces of the adjacent coupling members in the rows.

The engagement portion may have a gear structure. With this structure, the coupling members coupled to one another can be interlocked by the gear structure in which the engagement portions are engaged with one another.

The articulated coupling mechanism may be provided to constitute a pair that are away from each other in a width direction of the main body portion. With this structure, the display portion and the main body portion can be reliably coupled by the articulated coupling mechanism constituting the pair.

The electronic apparatus may further include a plurality of second coupling members that are provided coaxially with the rotation axes of the articulated coupling mechanism constituting the pair and couple the pair of the articulated coupling mechanism to each other. With this structure, it is possible to reinforce the articulated coupling mechanism constituting the pair and also improve the design of the articulated coupling mechanism.

According to the electronic apparatus of the embodiment of the present invention, it is possible to freely adjust a position of a display portion by articulated coupling members having a small axis diameter.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the drawings.

(Structure of Electronic Apparatus)

Figure 1:
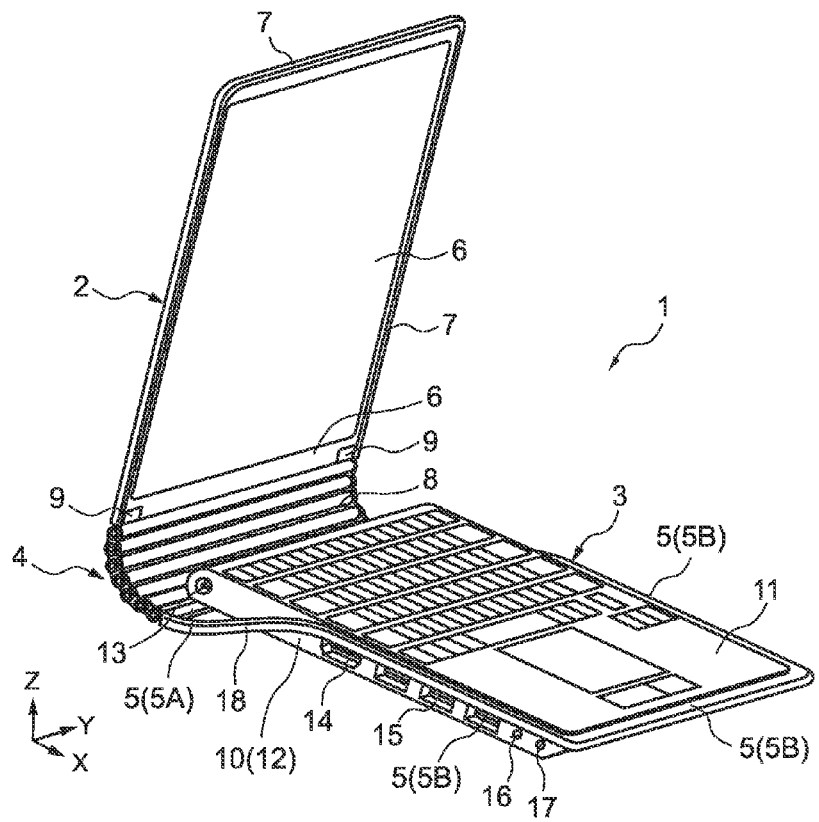
FIG. 1 is a perspective view showing an open state of an electronic apparatus according to an embodiment of the present invention.
Figure 2:
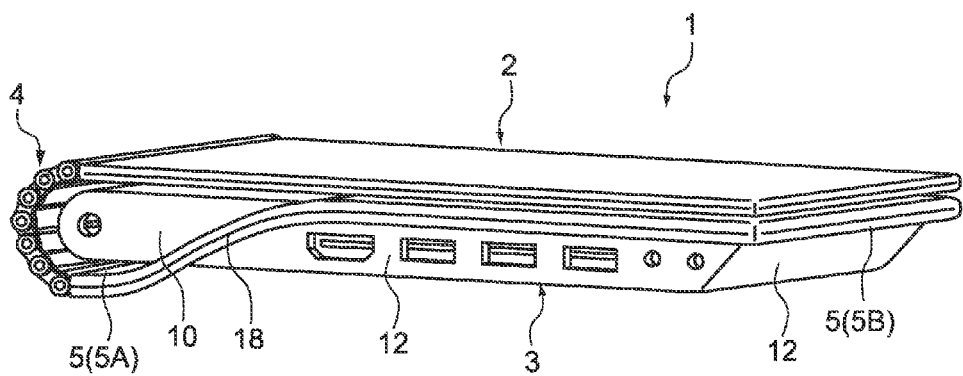
FIG. 2 is a perspective view showing a closed state of the electronic apparatus shown in FIG. 1.

FIG. 1 is a perspective view showing an open state of an electronic apparatus according to an embodiment of the present invention, and FIG. 2 is a perspective view showing a closed state of the electronic apparatus.

As shown in those figures, an electronic apparatus 1 includes a display portion 2, a main body portion 3, and an articulated coupling mechanism 4 for coupling the display portion 2 and the main body portion 3 to each other. The main body portion 3 includes a frame member 5 that is coupled to the articulated coupling mechanism 4. The display portion 2 is openable/closable (foldable) with respect to the main body portion 3 via the articulated coupling mechanism 4.

The display portion 2 includes a display including a display screen 6 such as an LCD (Liquid Crystal Display), and a casing 7 for accommodating the display. The display is connected to a system board of the main body portion 3 via a flexible board 8. The casing 7 has a size of 180 mm long and 260 mm wide, for example. A thickness of the display portion 2 is 3 mm, for example. The casing 7 of the display portion 2 is screwed to the articulated coupling mechanism 4 with screws 9 in the vicinity of both ends of the display portion 2 in a width direction (Y direction shown in FIG. 1).

The main body portion 3 includes the system board, an optical disc drive, a hard disk drive, a cooling fan (that are not shown in the figures), a casing 10 for accommodating those built-in components, and a keyboard unit 11.

The system board is mounted with various electronic components such as a CPU (Central Processing Unit), a main memory, a chip set, and various drive control circuits. The optical disc drive is connected to a connector terminal of the system board and performs read and write of information with respect to an optical disc such as a CD, a DVD, and a Blu-ray Disc that is detachable from the optical disc drive. The hard disk drive is connected to a connector terminal of the system board and performs read and write of information with respect to a hard disk included therein. The cooling fan cools the CPU mounted onto the system board or other heat generating devices.

The casing 10 has a length of 260 mm in the width direction (Y direction shown in FIG. 1) and a length of 180 mm in a depth direction (X direction shown in FIG. 1), for example. The casing 10 includes a side wall 12 having a predetermined thickness in a thickness direction of the main body portion 3 (Z direction shown in FIG. 1). A power source terminal 13, an external display output connector 14, a plurality of USB (Universal Serial Bus) connectors 15, a microphone input terminal 16, a headphone output terminal 17, and the like are provided to the side wall 12. For example, the external display output connector 14, the USB connectors 15, the microphone input terminal 16, and the headphone output terminal 17 are provided adjacently to each other, and the power source terminal 13 is provided at an end portion in the X direction of the side wall 12 on a back surface side of the main body portion 3. Though not shown in the figures, a side wall opposite to the side wall 12 is also provided with a plurality of interfaces.

The frame member 5 is a member for coupling the main body portion 3 and the articulated coupling mechanism 4 to each other and is provided to the side wall 12 and the like such that the frame member 5 surrounds the side wall 12 of the main body portion 3. The frame member 5 has an outer shape corresponding to that of the display portion 2 in a plane. A thickness of the frame member 5 (thickness in Z direction shown in FIG. 1) is 5 mm, for example.

The frame member 5 includes a main body portion side coupling portion 5A that is provided at a lower portion on the back surface side of the main body portion 3, and a U-shaped frame portion 5B that is provided along three side walls 12 except the back surface of the main body portion 3.

The main body portion side coupling portion 5A has a size corresponding to a size of the width of the main body portion 3 and is provided over the width direction of the main body portion 3 (Y direction shown in FIG. 1). For example, the main body portion side coupling portion 5A is coupled to the articulated coupling mechanism 4 with screws or the like. The main body portion side coupling portion 5A is provided away from a bottom surface of the main body portion 3 by a predetermined distance. It should be noted that the main body portion side coupling portion 5A may be provided to come into contact with the bottom surface of the main body portion 3. The main body portion side coupling portion 5A is provided at a position substantially the same as a position of the back surface of the main body portion 3 in the depth direction (X direction), but is not limited thereto.

The U-shaped frame portion 5B is fixed to the side wall 12 of the main body portion 3. Specifically, the U-shaped frame portion 5B is provided on an upper surface side of the main body portion 3 in the thickness direction of the side wall 12 (Z direction). A part of an upper surface of the frame portion 5B is located on substantially the same plane as an upper surface of the keyboard unit 11 (XP plane). The U-shaped frame portion 5B includes a curved portion 18 that is smoothly curved from the bottom surface side to the upper surface side (from upper surface side to bottom surface side) of the main body portion 3 at a position close to the articulated coupling mechanism 4 while avoiding the power source terminal 13.

When the display portion 2 is closed with respect to the main body portion 3, a curved shape of the articulated coupling mechanism 4 and that of the curved portion 18 constitute a smoothly curved shape. The end portion of the main body portion 3 on the back surface side is covered with the curved portion 18 and the articulated coupling mechanism 4 as shown in FIG. 2.

It should be noted that in a state where the display portion 2 is folded with respect to the main body portion 3 as shown in FIG. 2, a thickness of the articulated coupling mechanism 4 is about 30 mm, for example, but is not limited thereto.

Figure 3:
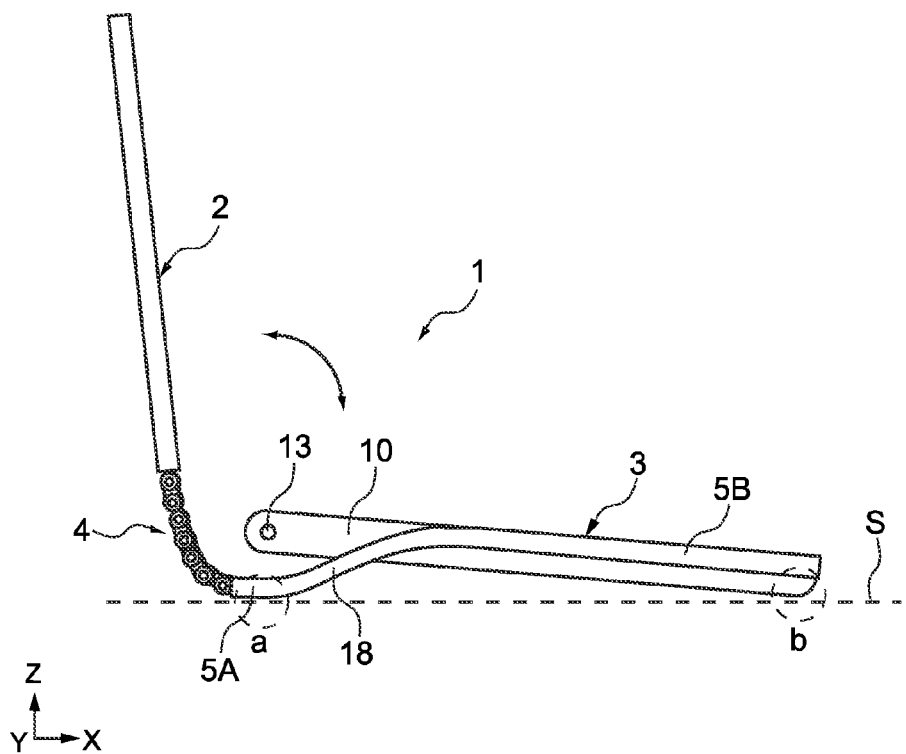
FIG. 3 is a side view of the electronic apparatus shown in FIG. 1.

FIG. 3 is a side view of the electronic apparatus 1 shown in FIG. 1.

The display portion 2 is openable at a predetermined angle with respect to the main body portion 3. The predetermined angle is within a range from 0 to 150 degrees, for example. The main body portion side coupling portion 5A of the frame member 5 is placed on a placement surface S at a point "a", and a front end of the bottom surface of the main body portion 3 is placed on the placement surface S at a point "b". In this case, the upper surface (input surface) of the keyboard unit 11 of the main body portion 3 is tilted due to the curved portion 18 at a tilt angle at which input is easily made by a user.

When the display portion 2 is opened with respect to the main body portion 3, the curved shape of the articulated coupling mechanism 4 and that of the curved portion 18 constitute a smoothly curved shape.

(Structure of Articulated Coupling Mechanism 4)

Figure 4:
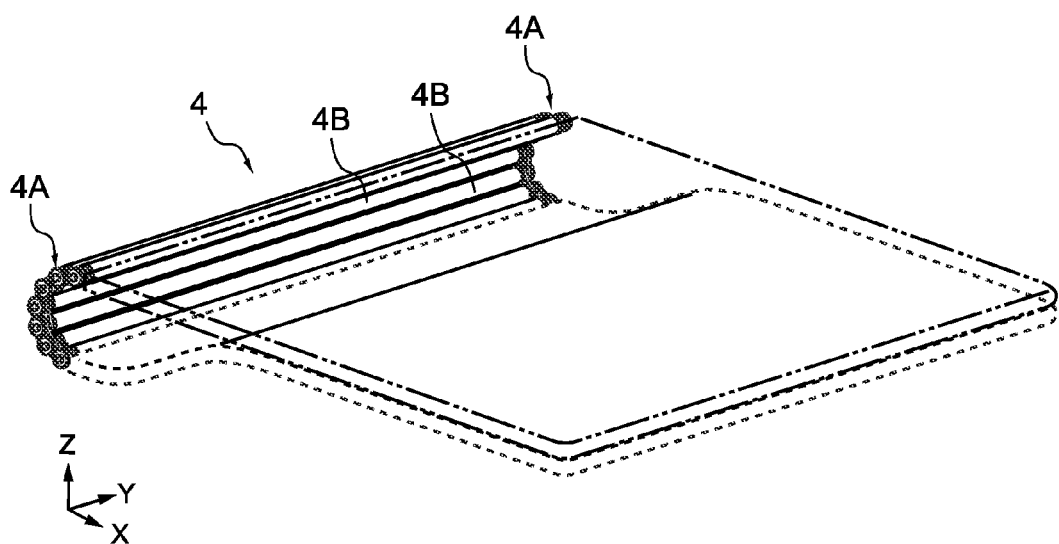
FIG. 4 is a view showing an articulated coupling mechanism of the electronic apparatus shown in FIG. 2.
Figure 5:
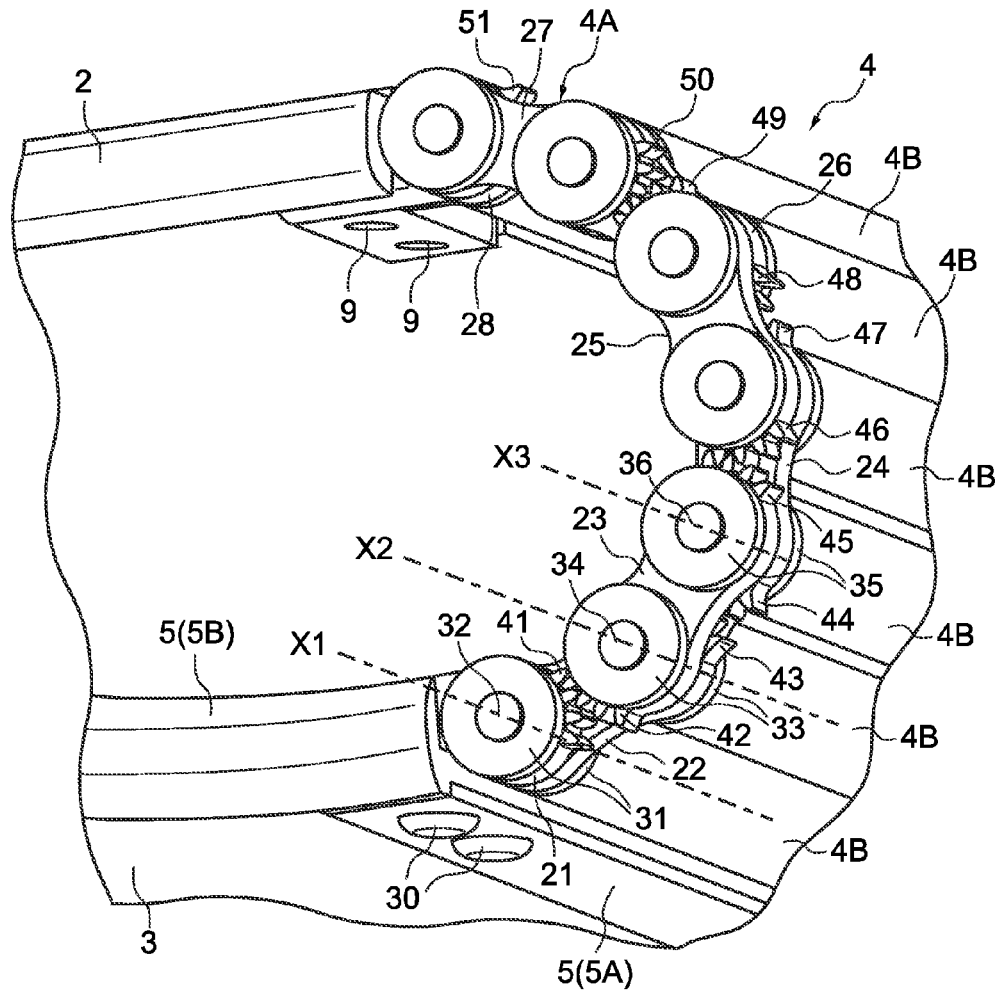
FIG. 5 is an enlarged view of the articulated coupling mechanism shown in FIG. 2.
Figure 6:
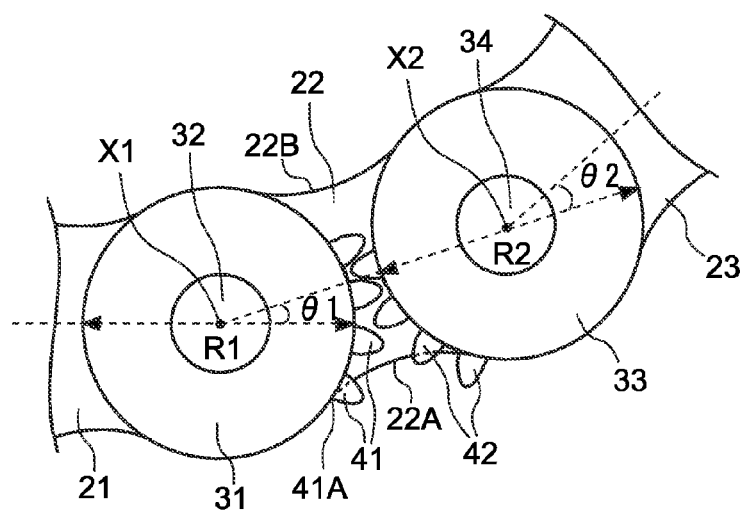
FIG. 6 is an enlarged view of a gear mechanism of the articulated coupling mechanism.

FIG. 4 is a view showing the articulated coupling mechanism 4 of the electronic apparatus 1 shown in FIG. 2. FIG. 5 is an enlarged view of the articulated coupling mechanism 4 shown in FIG. 2. FIG. 6 is an enlarged view of a gear mechanism serving as an interlock mechanism of the articulated coupling mechanism 4.

As shown in FIG. 4, the articulated coupling mechanism 4 includes a pair of articulated coupling mechanisms 4A arranged away from each other and a plurality of hollow coupling members 4B each arranged between the pair of articulated coupling mechanisms 4A coaxially with rotation axes. Since the pair of articulated coupling mechanisms 4A has the same structure, one of the pair of articulated coupling mechanisms 4A shown in FIG. 5 will be explained and descriptions of the structure of the other will be omitted.

As shown in FIG. 5, the articulated coupling mechanisms 4A includes coupling plates 21 to 28 that are rotatably coupled to one another.

The coupling plate 21 is screwed to the main body portion side coupling portion 5A with screws 30. The coupling plate 21 has a rotation axis X1. An axis diameter about the rotation axis X1 of the coupling plate 21 is an axis diameter R1 as shown in FIG. 6. The axis diameter R1 is 3 mm to 5 mm, for example.

The coupling plate 22 has rotation axes X1 and X2 at both end portions thereof. An axis diameter about the rotation axis X1 of the coupling plate 22 is an axis diameter R1 as shown in FIG. 6, and an axis diameter about the rotation axis X2 of the coupling plate 22 is an axis diameter R2. As shown in FIG. 6, a pair of side surfaces 22A and 22B extending in a longitudinal direction of the coupling plate 22 is chamfered (R 5.0 cm, R 3.0 cm, respectively). The coupling plate 22 has the same shape as the coupling plates 23 to 27. The coupling plate 22 overlaps an inner side of the coupling plate 21 with the rotation axis X1 of the coupling plate 21 and the rotation axis X1 of the coupling plate 22 being matched. The coupling plate 21 and the coupling plate 22 are rotatably coupled to each other by a coupling pin 32 via a pair of rings 31 provided outward of the coupling plate 21 and the coupling plate 22.

The coupling plate 23 has rotation axes X2 and X3 at both end portions thereof. The coupling plate 23 overlaps an outer side of the coupling plate 22 with the rotation axis X2 of the coupling plate 22 and the rotation axis X2 of the coupling plate 23 being matched. The coupling plate 22 and the coupling plate 23 are rotatably coupled to each other by a coupling pin 34 via a pair of rings 33 provided outward of the coupling plate 22 and the coupling plate 23. The coupling plates 24 to 28 are also rotatably coupled in the same manner. As described above, the coupling plates 21, 23, 25, and 27 are coupled to the coupling plates 22, 24, 26, and 28 so as to be located outward of the coupling plates 22, 24, 26, and 28. In other words, in the articulated coupling mechanism 4A, the coupling plates 21 to 28 are coupled in a zigzag manner to thus be arranged in two rows. The coupling plates 21, 23, 25, and 27 in the first row are arranged on an outer side of the width direction of the main body portion 3, and the coupling plates 22, 24, 26, and 28 in the second row are arranged on an inner side of the width direction of the main body portion 3. It should be noted that the example in which the rings 31, 33, 35 are provided has been described, but such rings may not be arranged as appropriate.

Each of the hollow coupling members 4B is formed with an opening for inserting the flexible board 8. The flexible board 8 is inserted into the hollow coupling member 4B so that the flexible board 8 is protected from the outside and hidden from view.

(Interlock Mechanism)

The articulated coupling mechanism 4 includes an interlock mechanism for interlocking the coupling plates 21 to 28.

The coupling plate 21 includes a plurality of gears 41 on a circumferential surface along a rotation direction thereof as shown in FIG. 6, the plurality of gears 41 protruding toward the coupling plate 23 side. An outer surface 41A of each of the gear 41 is chamfered (R 0.7 cm). The coupling plate 23 includes gears 42 that engage with the gears 41 of the coupling plate 21, on a circumferential surface along a rotation direction thereof. In other words, the coupling plates 21 and 23 that are adjacent to each other in the same row (outer row in width direction of main body portion 3) each have the circumferential surface along the rotation direction, and the circumferential surfaces are formed with the gears 41 and 42 that are engaged with each other.

Similarly, gears 43 of the coupling plate 22 and gears 44 of the coupling plate 24 are engaged with each other as shown in FIG. 5. Gears 45 of the coupling plate 23 and gears 46 of the coupling plate 25 are engaged with each other. Gears 47 of the coupling plate 24 and gears 48 of the coupling plate 26 are engaged with each other. Gears 49 of the coupling plate 25 and gears 50 of the coupling plate 27 are engaged with each other. Gears (not shown) of the coupling plate 26 and gears 51 of the coupling plate 28 are engaged with each other. Those gears 41 to 51 function as an interlock mechanism and interlock the coupling plate 21 to the coupling plate 28.

By the coupling pin 32 adjusting a contact area or a contact pressure between the rings 31 and the coupling plates 21 and 22 (the same holds true for the other coupling portions), a torque for keeping a desired position of the display portion 2 is ensured. Specifically, a torque is adjusted in accordance with a weight of the display portion 2. For example, when the weight of the display portion 2 is about 300 g, the torque is adjusted to about 30 N·mm. It should be noted that the torque can be changed as appropriate. Further, a rotation angle may be regulated in accordance with a shape of the gears 41, the gears 43, or the like. For example, by making a height (depth of tooth) of the gears 41 at both extremities, out of the gears 41 provided at predetermined pitches shown in FIG. 6, higher than that of the other gears 41, the desired position of the display portion 2 may be kept.

(Operation)

Figure 7:
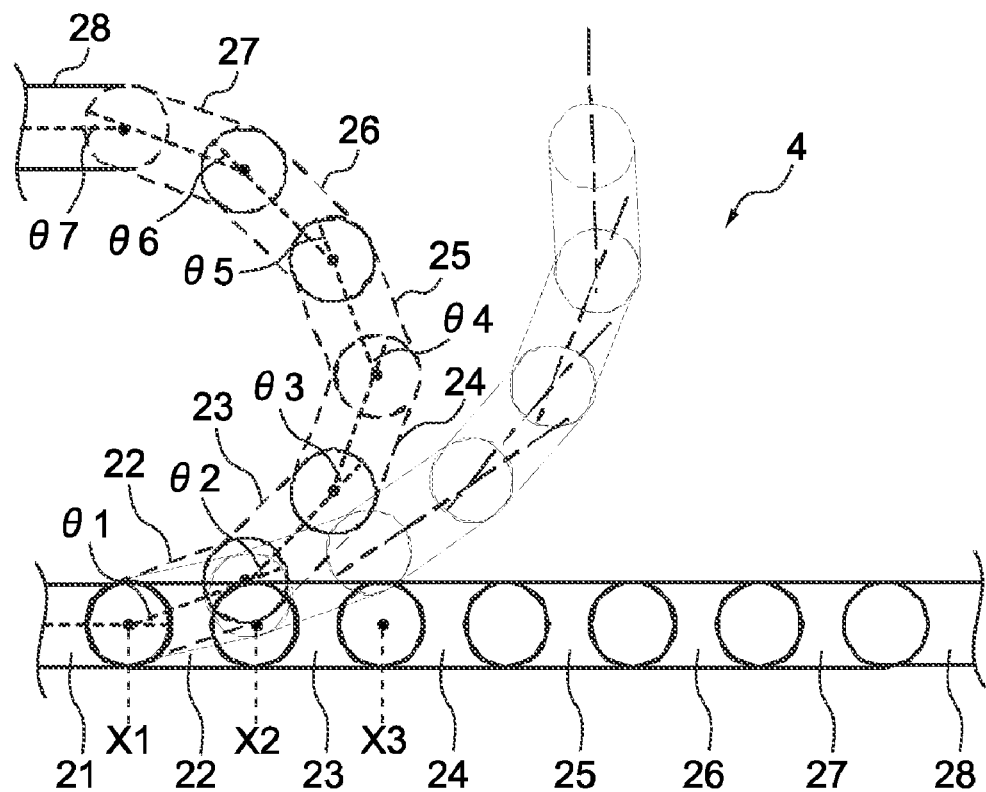
FIG. 7 is a view for explaining an operation of the articulated coupling mechanism when a display portion is opened and closed.

FIG. 7 is a view for explaining an operation of the articulated coupling mechanism 4 when the display portion 2 is opened and closed.

For example, when the coupling plate 22 is rotated about the rotation axis X1 by a rotation angle of $\theta 1$ in a counterclockwise direction with respect to the coupling plate 21, the gears 41 and the gears 42 are engaged with each other and in conjunction with the engagement, the coupling plate 23 is rotated about the rotation axis X2 by a rotation angle of $\theta 2$ in a counterclockwise direction with respect to the coupling plate 22. In conjunction with the rotation, the gears 43 and the gears 44 are engaged with each other and the coupling plate 24 is rotated about the rotation axis X3 by a rotation angle of $\theta 3$ with respect to the coupling plate 23. Similarly in conjunction with the rotation, the coupling plate 25 is rotated about a rotation axis X4 by a rotation angle of $\theta 4$ with respect to the coupling plate 24. In conjunction with that rotation, the coupling plate 26 is rotated by a rotation angle of $\theta 5$ with respect to the coupling plate 25, the coupling plate 27 is rotated by a rotation angle of $\theta 6$ with respect to the coupling plate 26, and the coupling plate 28 is rotated by a rotation angle of $\theta 7$ with respect to the coupling plate 27. In this case, the rotation angles $\theta 1$, $\theta 2$, $\theta 3$, $\theta 4$, $\theta 5$, $\theta 6$, and $\theta 7$ are substantially the same.

(Action Etc.)

As described above, according to this embodiment, the main body portion 3 and the display portion 2 are coupled to each other via the articulated coupling mechanism 4 that includes the coupling plates 21 to 28 rotatably coupled to each other in series, and the gears 41 to 51 for interlocking the rotations of the coupling plates 21 to 28 are provided to the coupling plates 21 to 28. Accordingly, a torque that is necessary for keeping the position of the display portion 2 with respect to the main body portion 3 can be dispersed at coupling portions of the coupling plates 21 to 28 having a small axis diameter R1 or the like, and the position of the display portion 2 can also be freely adjusted.

The coupling plate 21 having an axis diameter smaller than an axis diameter of a hinge of related art is coupled to the main body portion side coupling portion 5A. Accordingly, a thickness of the main body portion side coupling portion 5A to which the articulated coupling mechanism 4 is coupled can be reduced. Further, since it is unnecessary for arranging coupling portions on the back surface side of the main body portion 3, a thickness of the main body portion 3 (thickness in Z direction shown in FIG. 1) can be reduced, that is, areas of the main body portion 3 around the axes can be made thinner.

Since the articulated coupling mechanism 4 includes many rotation axes X1 and X2 and the like, an impactive force acting on the electronic apparatus 1 when the electronic apparatus 1 is dropped or the like can be dispersed by the many rotation axes X1 and X2 and the like. Accordingly, it is possible to increase shock resistance of the electronic apparatus 1. In particular, since the portion on the back surface side of the main body portion 3 is covered by the articulated coupling mechanism 4 as shown in FIG. 2, it is possible to certainly protect the portion on the back surface side of the main body portion 3 by the articulated coupling mechanism 4. In addition, since the flexible board 8 is gently curved at the many rotation axes X1 and X2 and the like in accordance with open/close of the display portion 2, it is possible to prevent the flexible board 8 from receiving a large load at one portion and being broken.

The pair of articulated coupling mechanisms 4A are provided away from each other at an interval in accordance with the width of the main body portion side coupling portion 5A as shown in FIG. 4, and the plurality of hollow coupling members 4B are provided between the pair of articulated coupling mechanisms 4A coaxially with the rotation axes. Accordingly, the articulated coupling mechanism 4 can be formed into a bellows-like shape and a design of the articulated coupling mechanism 4 can be made distinctive.

As shown in FIG. 1, the frame member 5 includes the curved portion 18 that is smoothly curved from the bottom surface side to the upper surface side of the main body portion 3 at a position close to the articulated coupling mechanism 4. Accordingly, the side wall of the display portion 2 and that of the frame member 5 are smoothly continued via the curved portion 18 and the articulated coupling mechanism 4, with the display portion 2 being opened and closed as shown in FIGS. 1 and 2. As a result, the design of the side surfaces of the electronic apparatus 1 can be further improved. Since the thickness of the frame member 5 (thickness in Z direction), the thickness of the articulated coupling mechanism 4, and the thickness of the display portion 2 are substantially the same and the frame member 5, the articulated coupling mechanism 4, and the display portion 2 are provided so that side surfaces thereof become continuous, a user can feel as if the coupling portions were not present, with the result that the design can be improved.

The power source terminal 13 can be provided on the side surface of the main body portion 3 on the back surface side as shown in FIG. 3, for example. As a result, the position of the power source terminal 13 can be seen easily and a power cable (not shown) can be easily connected to the power source terminal 13.

Second Embodiment

Next, an electronic apparatus according to a second embodiment of the present invention will be described. It should be noted that in the second and subsequent embodiments, components that are the same as those of the first embodiment are denoted by the same reference symbols, descriptions thereof are omitted, and different points will be mainly described.

Figure 8:
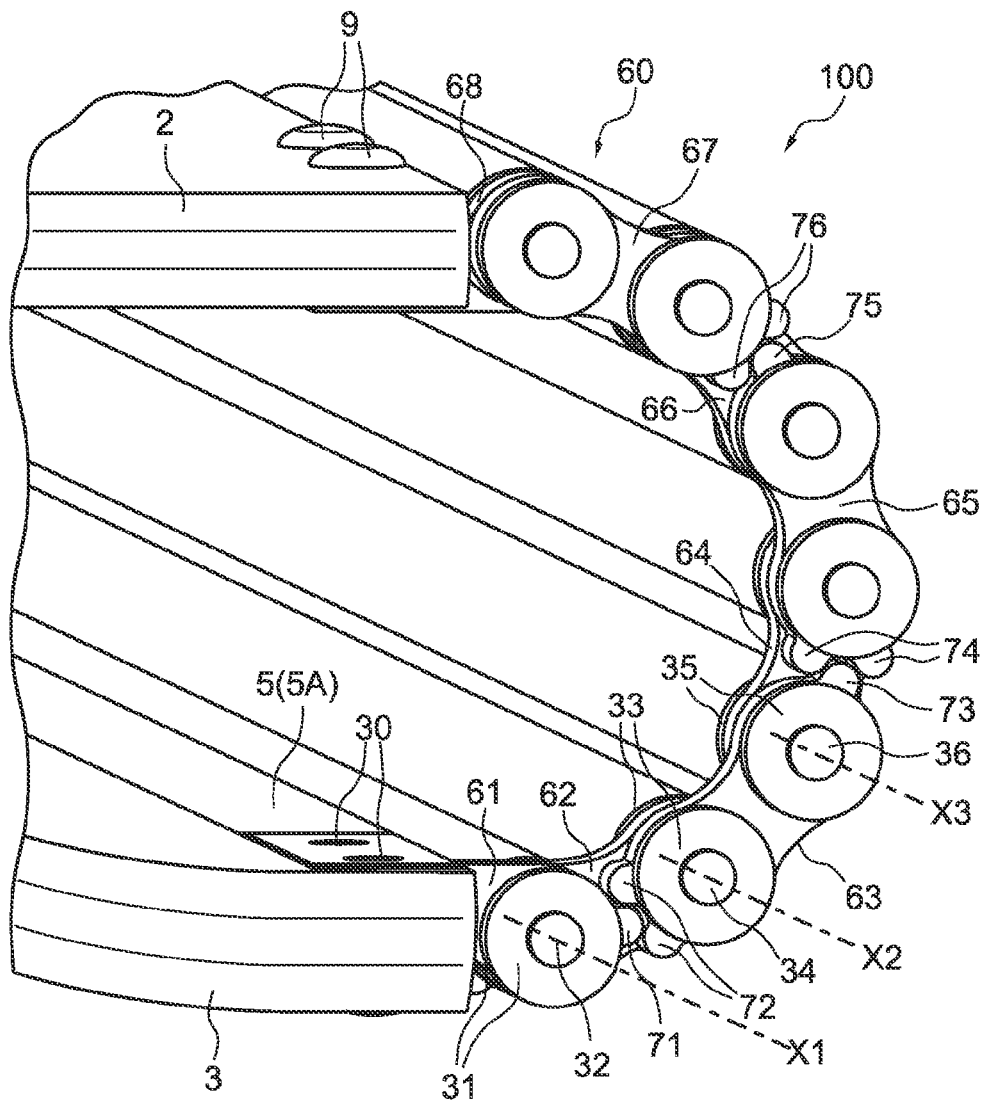
FIG. 8 is an enlarged view of an interlock mechanism of an articulated coupling mechanism of an electronic apparatus of a second embodiment.

FIG. 8 is an enlarged view of an interlock mechanism of an articulated coupling mechanism of the electronic apparatus of the second embodiment.

In this embodiment, an electronic apparatus 100 is different from the first embodiment in that the electronic apparatus 100 includes an articulated coupling mechanism 60 including cams in place of the articulated coupling mechanism 4 including the gears 41 and the like.

(Interlock Mechanism)

Coupling plates 61 to 68 of the articulated coupling mechanism 60 are rotatably coupled to one another as described above. The articulated coupling mechanism 60 includes a cam mechanism for interlocking the coupling plates 61 to 68.

The coupling plate 61 includes a cam 71 that protrudes toward the coupling plate 63 side. The coupling plate 63 includes a pair of cams 72 that are fitted to the cam 71 of the coupling plate 61. Similarly, a cam (not shown) of the coupling plate 62 and cams (not shown) of the coupling plate 64 are fitted to each other. A cam 73 of the coupling plate 63 and a pair of cams 74 of the coupling plate 65 are fitted to each other. A cam (not shown) of the coupling plate 64 and cams (not shown) of the coupling plate 66 are fitted to each other. A cam 75 of the coupling plate 65 and a pair of cams 76 of the coupling plate 67 are fitted to each other. A cam (not shown) of the coupling plate 66 and cams (not shown) of the coupling plate 68 are fitted to each other. Those cams 71 to 76 and the like interlock the coupling plates 61 to 68.

By the coupling pin 32 adjusting a contact area or a contact pressure between the rings 31 and the coupling plates 61 and 62 (the same holds true for the other coupling portions), a torque for keeping a desired position of the display portion 2 is ensured. It should be noted that a rotation angle may be regulated in accordance with a shape of the cam 71, the cams 72, and the like. For example, by making a height of the pair of cams 72 shown in FIG. 8 higher than that of the cam 71, the desired position of the display portion 2 may be kept.

Further, the example in which the shape of the cam 71 or the like is semicircular has been described, but the shape is not limited thereto. The shape may be changed to an oval shape or the like as appropriate.

Figure 9:
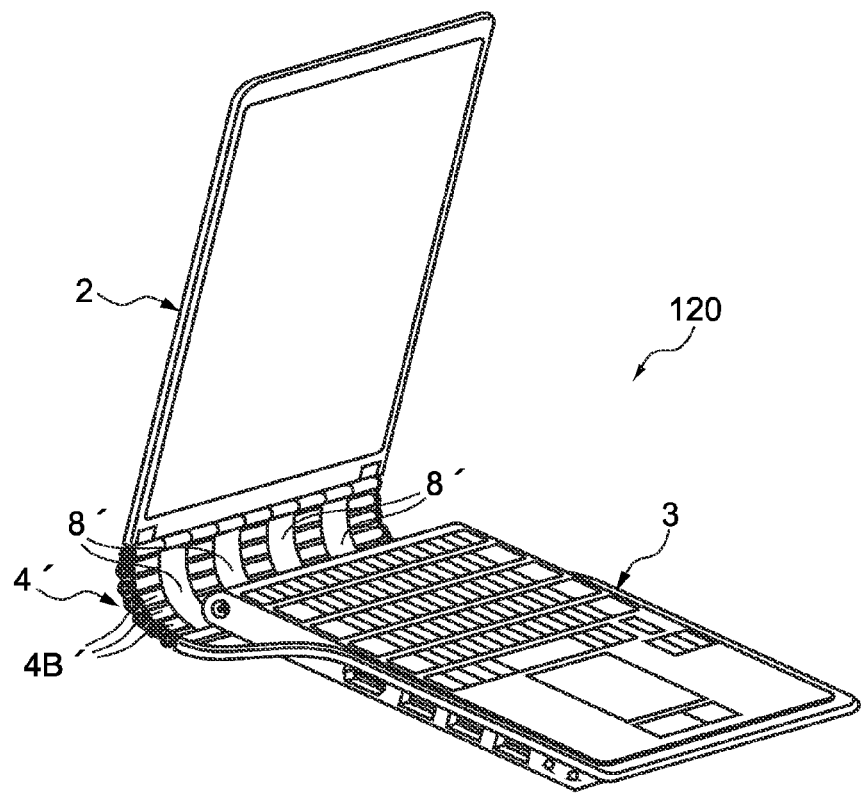
FIG. 9 is a perspective view of an electronic apparatus of a third embodiment.

FIG. 9 is a perspective view of an electronic apparatus of a third embodiment.

An electronic apparatus 120 is different from the first embodiment described above in that the flexible board 8 is arranged at a different position. In other words, an articulated coupling mechanism 4' of the electronic apparatus 120 includes a flexible board 8' that is not inserted into hollow coupling members 4B' but arranged on an inner surface of the articulated coupling mechanism 4'. The flexible board 8' is drawn out along a direction in which the coupling plates are coupled in series. The flexible board 8' is plurally provided, and the flexible boards 8' are away from each other in the width direction of the main body portion 3.

According to the structure as described above, the flexible boards 8' can be arranged with ease while suppressing production costs of the articulated coupling mechanism 4', with the result that a production time can be reduced for lowering of the costs.

Figure 10:
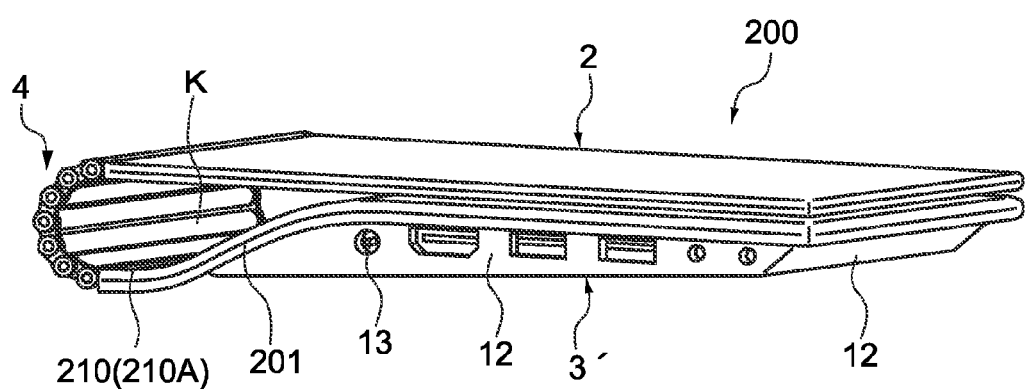
FIG. 10 is a perspective view showing a closed state of an electronic apparatus of a fourth embodiment.

FIG. 10 is a perspective view showing a closed state of an electronic apparatus of a fourth embodiment.

An electronic apparatus 200 is different from the first embodiment described above in that the electronic apparatus 200 includes a main body portion 3' whose upper surface is covered by a cover portion 210 including a main body portion side coupling portion 210A for coupling the articulated coupling mechanism 4.

The cover portion 210 covers the entire upper surface of the main body portion 3', includes a curved surface portion 201, and protrudes from the side wall 12 of the main body portion 3'. A planer shape of the cover portion 210 is substantially the same as that of the display portion 2. The curved surface portion 201 is smoothly curved from a bottom surface side to an upper surface side of the main body portion 3'. The main body portion side coupling portion 210A provided at an end portion of the cover portion 210 on a back surface side of the main body portion 3' is coupled with the articulated coupling mechanism 4 using screws or the like as described above. The power source terminal 13 is provided on the side wall 12 at a lower portion of the cover portion 210.

The cover portion 210 comes into contact with and overlaps the display portion 2 except the curved surface portion 201 and the main body portion side coupling portion 210A, in a state where the display portion 2 is closed with respect to the main body portion 3' as shown in FIG. 10. With the curved surface portion 201, the articulated coupling mechanism 4, and a part of the display portion 2, a hollow area K is formed at a position corresponding to a position of a hinge in related art.

(Action etc.)

As described above, according to this embodiment, the hollow area K is formed in the state where the display portion 2 is closed with respect to the main body portion 3' as shown in FIG. 10, with the result that a coupling portion that uses the articulated coupling mechanism 4 having an axis diameter smaller than that of the hinge for coupling the main body portion and display portion in related art and is excellent in design can be structured.

Figure 11:
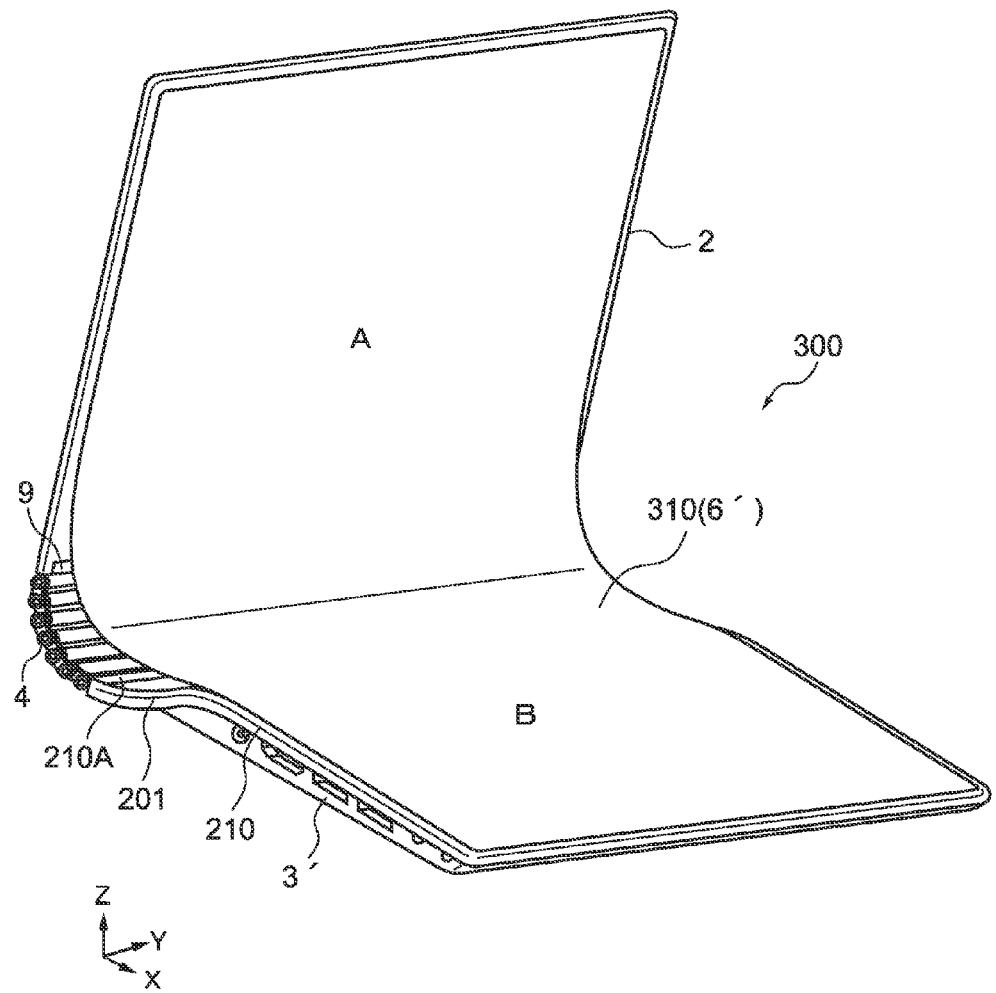
FIG. 11 is a perspective view showing an open state of an electronic apparatus of a fifth embodiment.

FIG. 11 is a perspective view showing an open state of an electronic apparatus of a fifth embodiment.

An electronic apparatus 300 of this embodiment is different from the fourth embodiment described above in that a display screen 6' is arranged in a different area.

In other words, the electronic apparatus 300 includes a flexible display 310 provided over the entire upper surface of the cover portion 210 from the display portion 2.

As the sheet-like flexible display 310, a thin display panel having flexibility is used, for example. The display screen 6' is arranged over a display area A corresponding to the display portion 2 and a display area B corresponding to the main body portion 3'. The display screen 6' has a size of 260 mm wide (Y direction shown in FIG. 11) and (180×2 mm+length of articulated coupling mechanism 4) mm long (X direction shown in FIG. 11).

Figure 12:
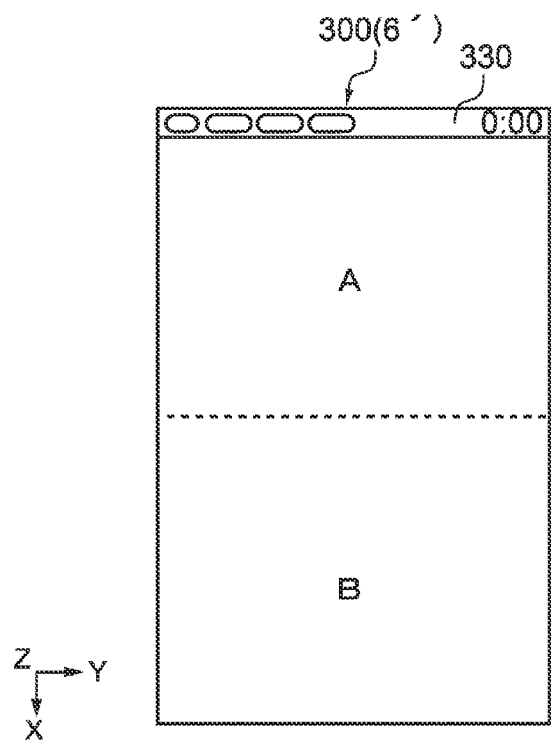
FIG. 12 is a view showing an example of a display screen of the electronic apparatus shown in FIG. 11.

FIG. 12 is a view showing an example of the display screen 6' of the electronic apparatus 300 shown in FIG. 11.

A status bar 330 and the like are displayed on the top of the display screen 6', and images, moving images, and the like are displayed in other areas of the display screen 6'. According to the structure as described above, it is possible to use the electronic apparatus 300 as an electronic apparatus 300 including a vertically long display screen 6' and display, in an enlarged manner, an image or the like on the entire area of the vertically long and wide display screen 6'.

Figure 13:
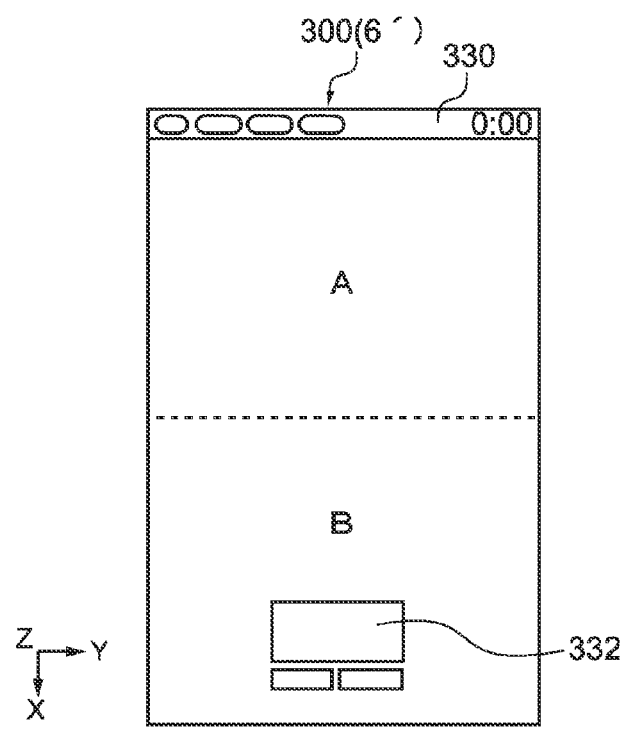
FIG. 13 is a view showing another example of the display screen of the electronic apparatus shown in FIG. 11.

FIG. 13 is a view showing another example of the display screen 6' of the electronic apparatus 300 shown in FIG. 11.

In addition to the status bar 330 on the top of the display screen 6', a touch pad 332 is displayed in the display area B. The touch pad 332 has a function similar to that of a touch pad of a laptop personal computer in related art. According to the structure as described above, a user can make an input operation using the touch pad 332 when desiring to make the input operation.

Figure 14:
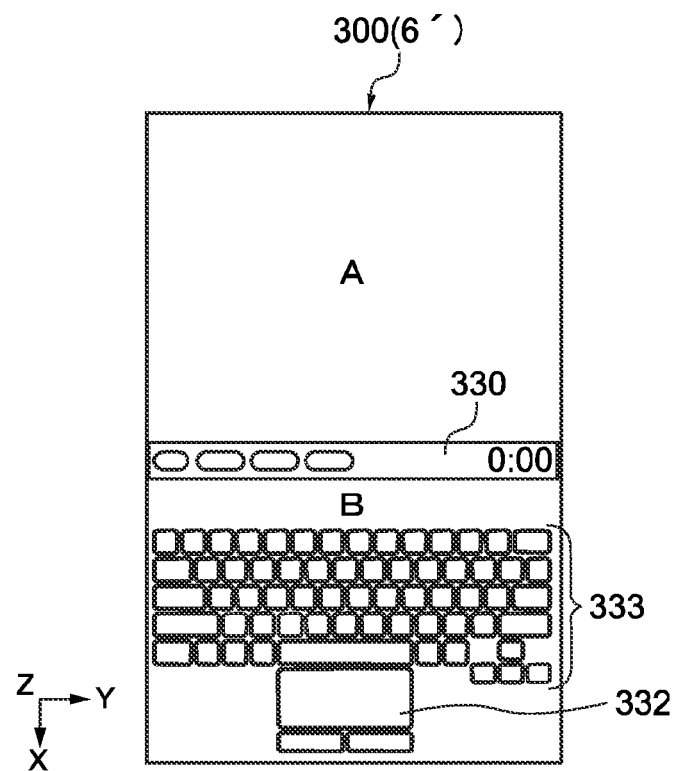
FIG. 14 is a view showing another example of the display screen of the electronic apparatus shown in FIG. 11.

FIG. 14 is a view showing another example of the display screen 6' of the electronic apparatus 300 shown in FIG. 11.

The status bar 330 and the like are displayed at the center of the display screen 6' (boundary area between display area A and display area B), and the touch pad 332 and a keyboard input portion 333 are displayed in the display area B. The keyboard input portion 333 has a function similar to that of a keyboard in related art. Accordingly, a user can make an input operation using the keyboard input portion 333 when desiring to make a key input operation.

Figure 15:
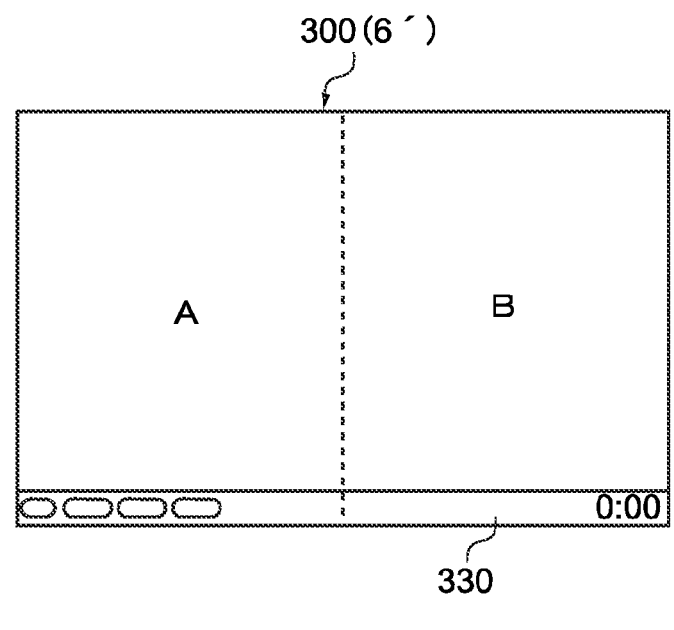
FIG. 15 is a view showing another example of the display screen of the electronic apparatus shown in FIG. 11.

FIG. 15 is a view showing another example of the display screen 6' of the electronic apparatus 300 shown in FIG. 11.

The status bar 330 and the like are displayed at an end portion on one side of the display screen 6', and an image or the like is displayed in other area of the display screen 6'. According to the structure as described above, it is possible to use the electronic apparatus 300 as an electronic apparatus 300 including a horizontally long and wide display screen 6'.

Figure 16:
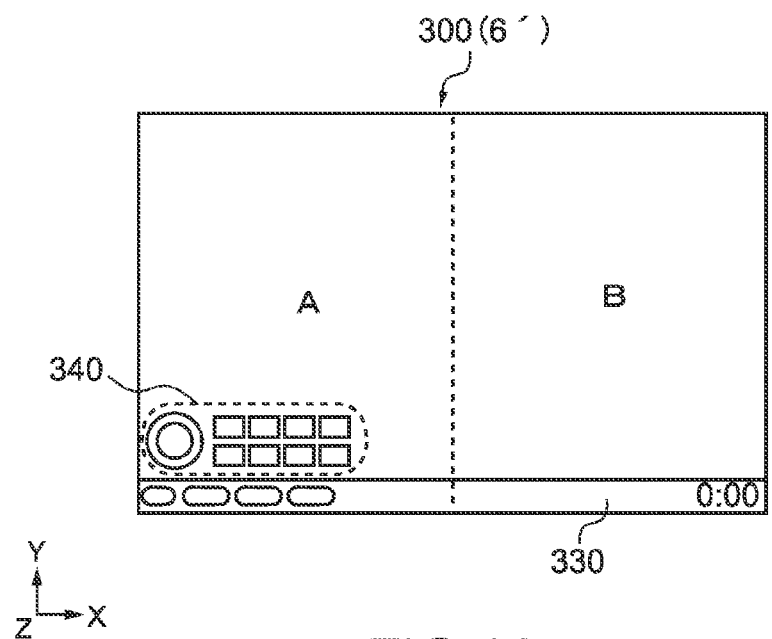
FIG. 16 is a view showing another example of the display screen of the electronic apparatus shown in FIG. 11.

FIG. 16 is a view showing another example of the display screen 6' of the electronic apparatus 300 shown in FIG. 11.

In addition to the status bar 330 and the like shown in FIG. 15, a circular key or rectangular key 340 is displayed in a part of the display areas A and B, for example. The circular key or rectangular key 340 is used for selecting or determining letters, symbols, or the like. According to the structure as described above, it is possible to perform an input operation using the key 340 displayed on the display screen 6' while viewing an image or the like displayed on the display screen 6'.

Figure 17:
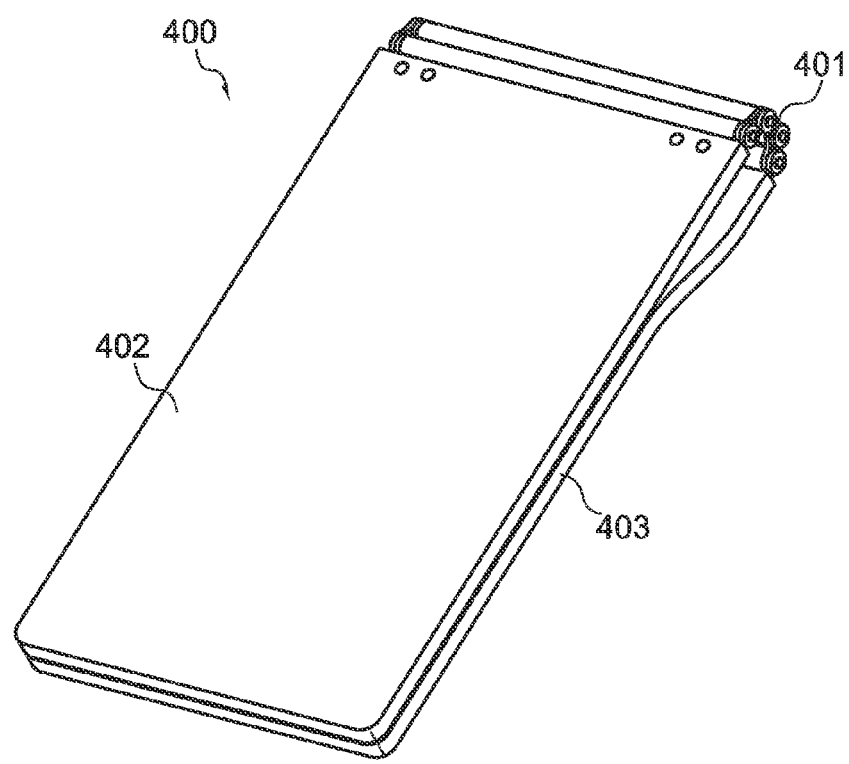
FIG. 17 is a perspective view showing a closed state of an electronic apparatus of a sixth embodiment.
Figure 18:
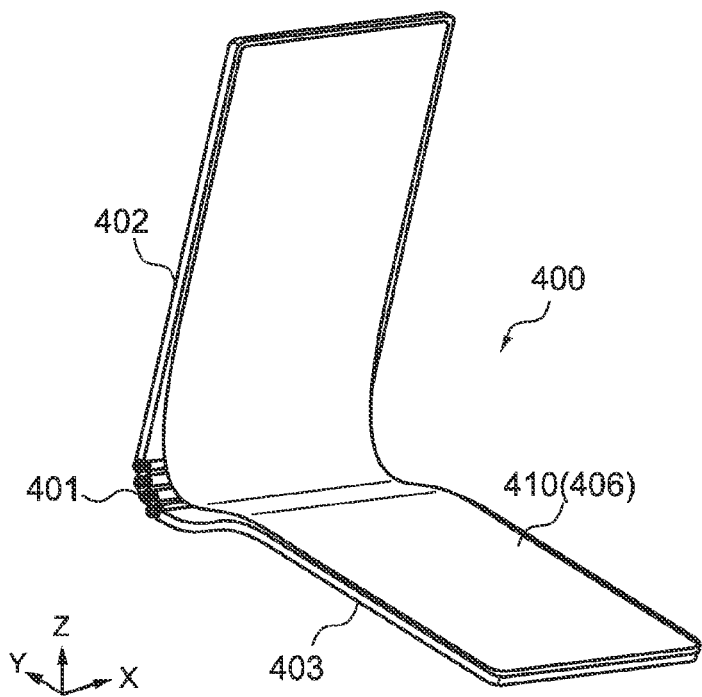
FIG. 18 is a perspective view showing an open state of the electronic apparatus shown in FIG. 17.

FIG. 17 is a perspective view showing a closed state of an electronic apparatus of a sixth embodiment, and FIG. 18 is a perspective view showing an open state of the electronic apparatus shown in FIG. 17.

This embodiment is an example in which the present invention is applied to a cellular phone. An electronic apparatus 400 according to this embodiment of the present invention includes an articulated coupling mechanism 401 having the same structure as that of the articulated coupling mechanism 4 described above. The articulated coupling mechanism 401 is structured similar to the articulated coupling mechanism 4 except that the coupling number of the coupling plates that are coupled in series is small and the axis diameter of the coupling plates is reduced, as compared to the first embodiment etc. described above. As shown in FIG. 18, the electronic apparatus 400 includes a display 410 provided over the entire area extending from a display portion 402 side to a main body portion 403 side. The display 410 includes a display screen 406 on which an image or the like is displayed. For the display 410, a thin display panel having flexibility is used, for example.

According to the structure as described above, the display portion 402 and the main body portion 403 can be coupled to each other using the articulated coupling mechanism 401 including the coupling plates of a small axis diameter even in the electronic apparatus 400 such as a cellular phone. Further, it is possible to couple and fix the coupling plates of a small axis diameter to the thin main body portion 403 and achieve thinning of the main body portion 403 in the vicinity of the axis. Moreover, it is possible to display a large size or large amount of information by the large display screen 406.

Figure 19:
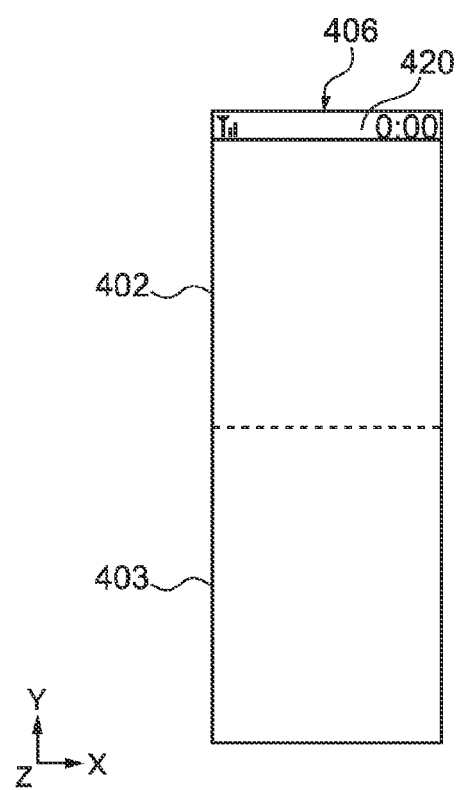
FIG. 19 is a view showing an example of a display screen of the electronic apparatus shown in FIG. 18.

FIG. 19 is a view showing an example of the display screen 406 of the electronic apparatus 400 shown in FIG. 18.

An information bar 420 and the like are displayed on the top of the display screen 406, and images, moving images, and the like are displayed in other area of the display screen 406. According to the structure as described above, it is possible to use the electronic apparatus 400 as an electronic apparatus 400 including a vertically long display screen 406 and display an image or the like in an enlarged manner or in a large amount on the entire area of the vertically long and wide display screen 406.

Figure 20:
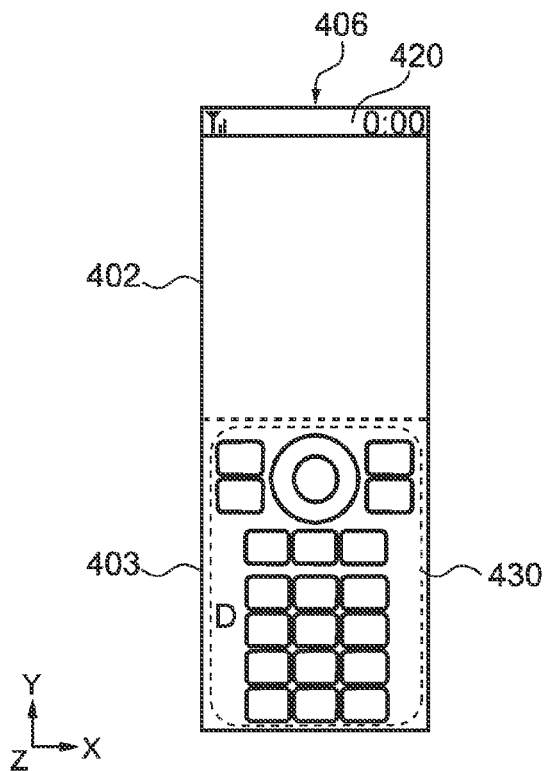
FIG. 20 is a view showing an example of the display screen of the electronic apparatus shown in FIG. 18.

FIG. 20 is a view showing an example of the display screen 406 of the electronic apparatus 400 shown in FIG. 18.

In addition to the information bar 420 and the like on the top of the display screen 406, an input key 430 is displayed in a display area D. The input key 430 has a function similar to that of an input key of a cellular phone in related art. According to the structure as described above, a user can make an input operation using the input key 430 when desiring to make an input operation.

Figure 21:
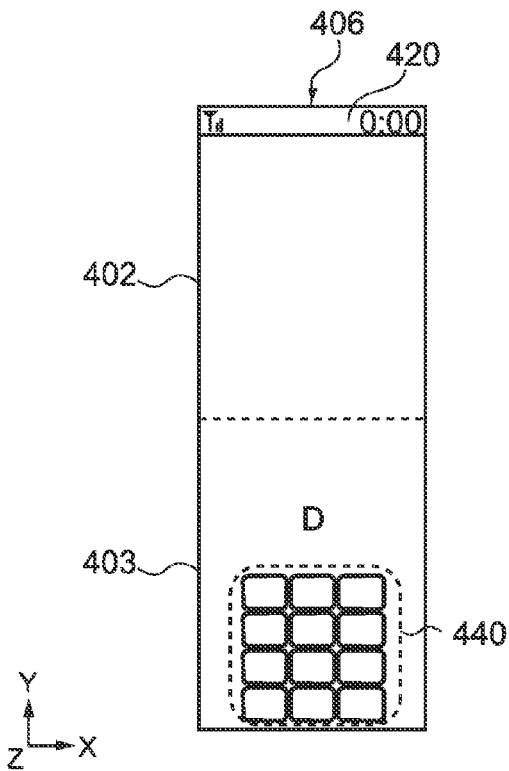
FIG. 21 is a view showing an example of the display screen of the electronic apparatus shown in FIG. 18.

FIG. 21 is a view showing an example of the display screen 406 of the electronic apparatus 400 shown in FIG. 18.

In addition to the information bar 420 and the like on the top of the display screen 406, an input key 440 is displayed in the display area D. The input key 440 has a function similar to that of an input key for inputting numbers, letters, or the like of a cellular phone in related art. According to the structure as described above, a user can make an input operation using the input key 440 when desiring to input numbers or letters, for example.

Figure 22:
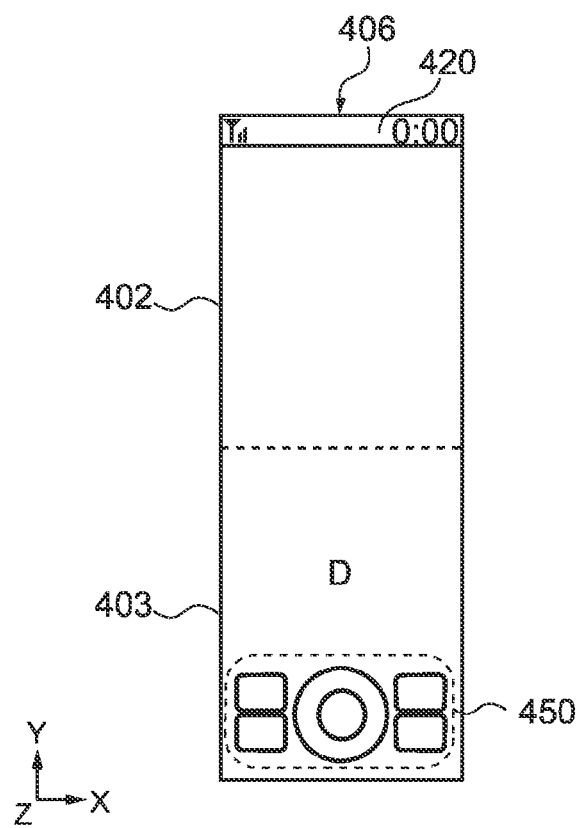
FIG. 22 is a view showing an example of the display screen of the electronic apparatus shown in FIG. 18.

FIG. 22 is a view showing an example of the display screen 406 of the electronic apparatus 400 shown in FIG. 18.

In addition to the information bar 420 and the like on the top of the display screen 406, a selection/determination input key 450 and the like are displayed in the display area D. The selection/determination input key 450 has a function similar to a selection/determination input key for selecting or determining numbers, letters, or the like of a cellular phone in related art. According to the structure as described above, a user can make an input operation using the selection/determination input key 450 when desiring to make an input operation of selecting or determining letters or numbers, for example.

Figure 23:
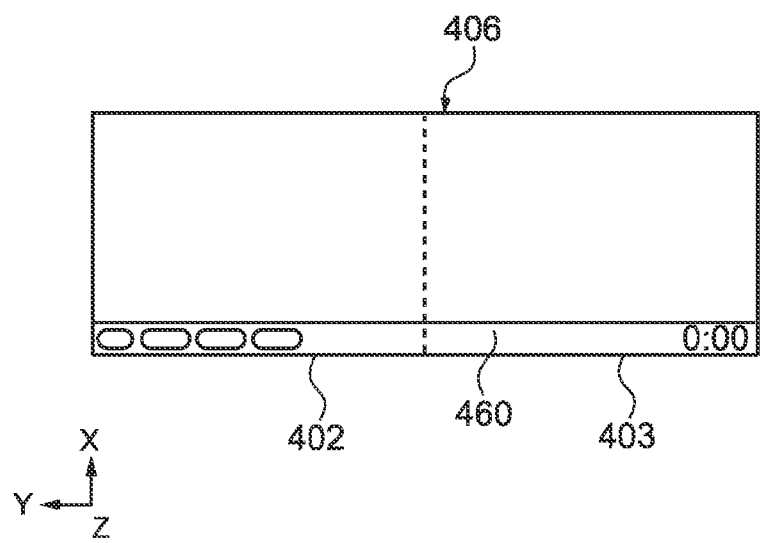
FIG. 23 is a view showing an example of the display screen of the electronic apparatus shown in FIG. 18.

FIG. 23 is a view showing an example of the display screen 406 of the electronic apparatus 400 shown in FIG. 18.

An information bar 460 and the like are displayed at an end portion on one side of the display screen 406, and an image or the like is displayed in other area of the display screen 406. According to the structure as described above, it is possible to use the electronic apparatus 400 as an electronic apparatus 400 including a horizontally long and wide display screen 406.

Figure 24:
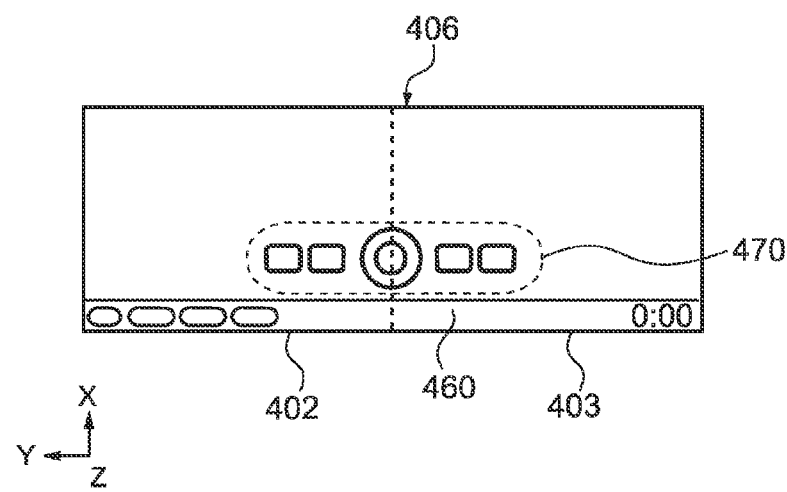
FIG. 24 is a view showing an example of the display screen of the electronic apparatus shown in FIG. 18.

FIG. 24 is a view showing an example of the display screen 406 of the electronic apparatus 400 shown in FIG. 18.

In addition to the information bar 460 and the like, a circular key or rectangular key 470 is displayed on the display screen 406, for example. The circular key or rectangular key 470 has a function similar to that of a selection/determination input key for selecting or determining numbers, letters, or the like of a cellular phone in related art. According to the structure as described above, it is possible to make an input operation of selecting or determining letters or numbers using the key 470 displayed on the display screen 406 while viewing an image or the like displayed on the display screen 406.

Figure 25:
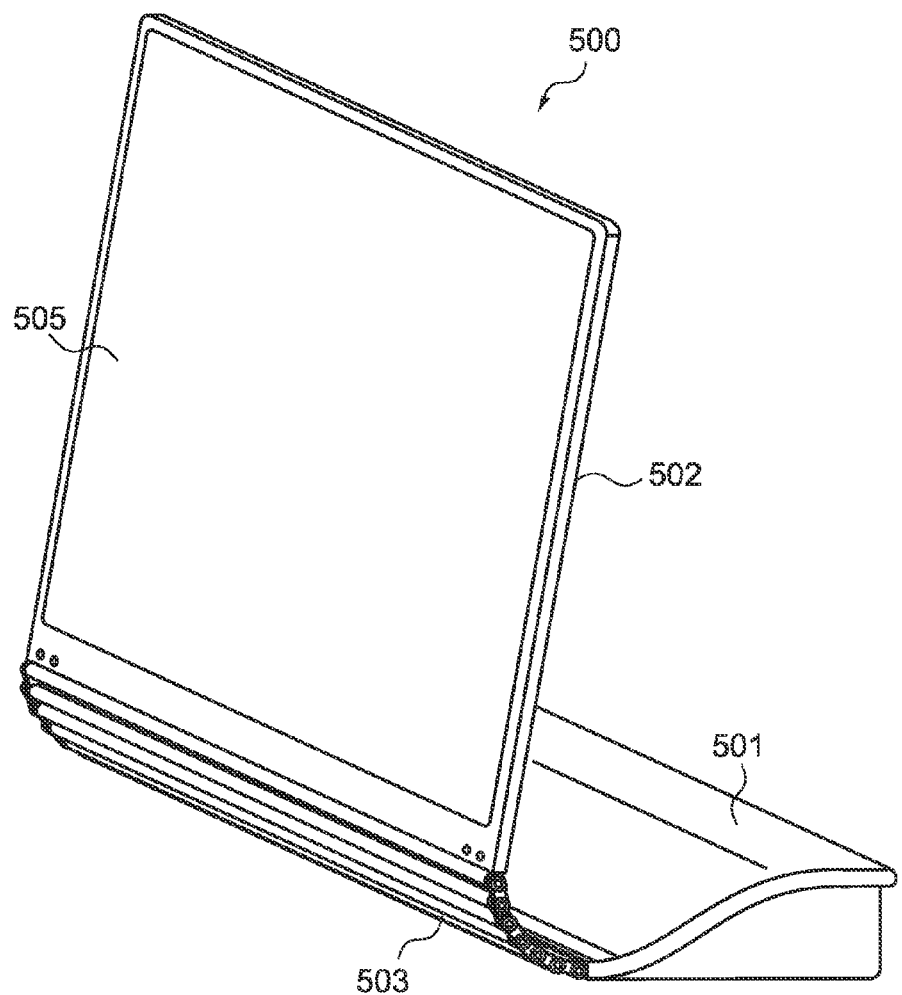
FIG. 25 is a perspective view showing an open state of an electronic apparatus of a seventh embodiment.

FIG. 25 is a perspective view showing an open state of an electronic apparatus of a seventh embodiment.

This embodiment is an example in which the present invention is applied to a foldable thin television. An electronic apparatus 500 includes a main body portion 501 that can receive content data such as a program, a display portion 502 on which the content data received by the main body portion 501 is displayed, and an articulated coupling mechanism 503 that couples the main body portion 501 and the display portion 502 to each other. The articulated coupling mechanism 503 has the same structure as that of the articulated coupling mechanism 4 of the embodiments described above. The display portion 502 includes a display screen 505 on an opposite side of a surface facing the main body portion 501 when the electronic apparatus 500 is folded. The main body portion 501 includes an upper surface having a curved shape that is smoothly continuous with a curved shape of a side surface of the articulated coupling mechanism 503 in a state where the display portion 502 is opened with respect to the main body portion 501.

According to the structure as described above, it is possible to improve the design of the electronic apparatus 500 because the curved shape of the articulated coupling mechanism 503 and the upper surface of the main body portion 501 is likely to be conspicuous when a user views contents displayed on the display screen 505.

The present application contains subject matter related to that disclosed in Japanese Priority Patent Application JP 2009-062753 filed in the Japan Patent Office on Mar. 16, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
    a display portion that includes a display screen;
    a main body portion that is coupled to the display portion;
    an articulated coupling mechanism that includes, at each of end portions, a plurality of coupling members each having a rotation axis and being rotatably coupled to one another in series about the rotation axis, the plurality of coupling members coupled in series having one end coupled to the main body portion side and the other end coupled to the display portion side; and
    an interlock mechanism to interlock rotations of the plurality of coupling members with one another in the articulated coupling mechanism.

2. The electronic apparatus according to claim 1,
    wherein the articulated coupling mechanism is structured by coupling the plurality of coupling members in a zigzag manner to be arranged in two rows, and
    wherein the adjacent coupling members in the rows each include a circumferential surface along a rotation direction and an engagement portion on the circumferential surface so that the engagement portions are engaged with each other.

3. The electronic apparatus according to claim 2,
    wherein the engagement portion has a gear structure.

4. The electronic apparatus according to claim 3,
    wherein the articulated coupling mechanism is provided to constitute a pair that are away from each other in a width direction of the main body portion.

5. The electronic apparatus according to claim 4, further comprising
    a plurality of second coupling members that are provided coaxially with the rotation axes of the articulated coupling mechanism constituting the pair and couple the pair of the articulated coupling mechanism to each other.

* * * * *